United States Patent [19]
Siminsky

[11] 3,872,600
[45] Mar. 25, 1975

[54] GAUGES AND THE LIKE
[76] Inventor: Konstantine George Siminsky, 33 Wongal Cres., Beecroft, New South Wales, Australia
[22] Filed: Aug. 29, 1972
[21] Appl. No.: 284,539

[30] Foreign Application Priority Data
Aug. 30, 1971 Australia............................ 6090/71

[52] U.S. Cl............................................. 33/178 R
[51] Int. Cl. ............................................... G01b 3/46
[58] Field of Search........... 33/178 R, 178 F, 178 B, 33/174 Q

[56] References Cited
UNITED STATES PATENTS
1,476,681    12/1923   Bath et al.......................... 33/178 R
1,819,144    8/1931    Aulenback........................ 33/178 R
2,595,917    5/1952    Bath et al.......................... 33/178 R Primary Examiner—Richard E. Aegerter
Assistant Examiner—Willis Little
Attorney, Agent, or Firm—Browne, Beveridge, DeGrandi & Kline

[57] ABSTRACT

A precision gauging tool of a plug or ring type comprising a plurality of longitudinal segments grouped about a common axis. The segments are held in grouped array by engagement of conical or similarly convergent end shoulders with screw-adjustable clamping means. The clamping means can be relaxed and retightened to permit resetting of the gauge size.

10 Claims, 13 Drawing Figures

GAUGES AND THE LIKE

This invention relates to adjustable precision tools of plug or ring type. The invention is thus applicable to gauges used for controlling or testing the form and dimension of work-pieces; and, more particularly, of the type known as ring gauges and plug gauges; it is also applicable to screw-threading taps and dies, die-nuts and similar tools.

As the invention is primarily intended for use in connection with ring gauges and plug gauges, it will be described herein, by way of example, mainly in terms of that particular use.

Plug and ring gauges are commonly used for testing the form and dimensions, either internal or external, of cylindrical or conical articles either with plain internal or external surfaces or such surfaces which are screwed.

The present invention is applicable quite generally to all gauges of the kind indicated above including such gauges in plural form when made, for example, as GO and NOT GO gauges or a combination of both.

It has long been common to make plug or ring gauges as "solid" gauges; that is gauges not capable of size adjustment. Such non-adjustable gauges are satisfactory for as long as they remain unworn, but use to any substantial extent necessarily involves wear and corresponding inaccuracy in the required gauge size; quite apart from this question of wear, the prior non-adjustable gauges have to be made within dimensional tolerance limits, which reduce the tolerance available to the work pieces.

The indicated shortcomings are such that in many instances of workshop or toolroom practice where ring or plug gauges could be usefully employed, other less convenient means are used instead, e.g., direct measurement, measurement under magnification and the like.

The object of the present invention is to meet the indicated shortcomings in a simple and reliable way.

The invention provides:

A tool comprising:
a. An array of segments grouped about a single axis and each having a working surface, a tapered backing surface opposite said working surface, and two end shoulders which, at least in part, mutually converge in the direction towards said working surface;
b. an adjustment guiding member which engages the backing surfaces of said segments; and,
c. adjustment and clamping means engaged with and enabling selected axial displacement of said adjustment guiding member and having bearing portions which bear upon said shoulders, so that upon tightening of said adjustment and clamping means said segments are fixedly held together in selected adjustment.

Examples of gauges according to the invention are illustrated in the drawings herewith.

Figure 1:
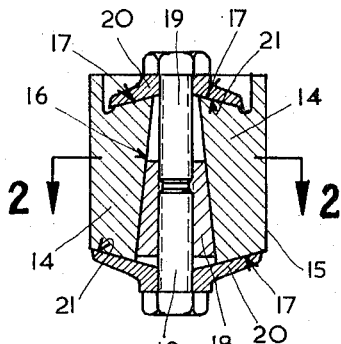
FIG. 1 is a medial cross-sectional elevation of a plug gauge having three gauging segments.
Figure 2:
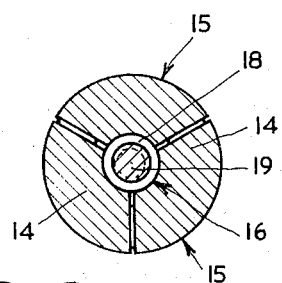
FIG. 2 is a sectional plan taken on line 2—2 in FIG. 1.

Referring to FIGS. 1 and 2, the three gauging segments 14 each have a longitudinally axially directed working or gauging surface 15, a substantially axially directed acutely tapered backing surface 16, and a pair of shoulders 17. The surface 16, in this instance, is conical.

In the embodiment under discussion, the shoulders 17 are frusto-conical and in each of the segments they mutually converge towards the working surfaces 15 of the segment to which they belong. The surfaces 16 engage with an adjustment guiding member 18 which is frusto-conical and circumferentially engages backing surfaces 16.

The adjusting and clamping means (in FIGS. 1 and 2) comprise bolts 19 and washers 20. The washers are close fitting about the bolts 19, and have bearing portions 21 which envelope and ride the shoulders 17, or at least those parts of the shoulders which converge towards gauging surfaces 15.

Figure 3:
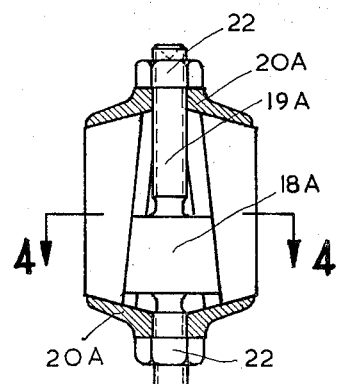
FIG. 3 is a view similar to FIG. 1 showing a modified arrangement.
Figure 4:
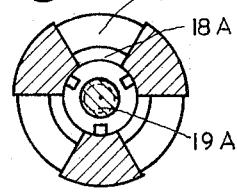
FIG. 4 is a sectional plan taken on line 4—4 in FIG. 3.

Referring to FIGS. 3 and 4, the clamping means there shown, (instead of consisting of set screws such as 19 which screw into adjustment guiding member 18, as in FIG. 1) consist of a pair of threaded stems 19A which are integral with the adjustment guiding member 18A and are furnished with nuts 22 which can be tightened against washers 20A.

Figure 5:
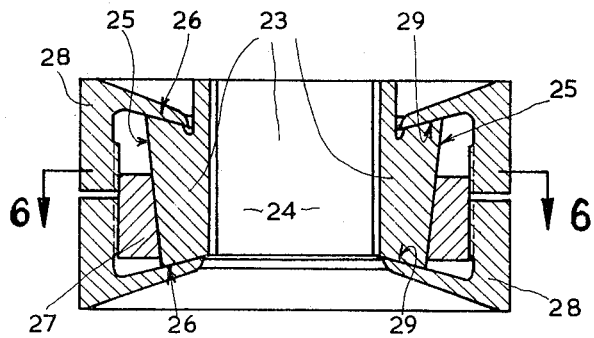
FIG. 5 is a medial cross-sectional elevation of a ring gauge having three gauging segments.
Figure 6:
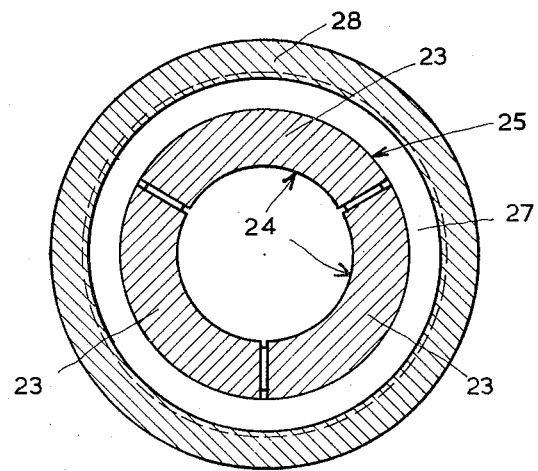
FIG. 6 is a sectional plan taken on line 6—6 in FIG. 5.

Referring to FIGS. 5 and 6, the gauging segments 23 each have an axially directed working or gauging surface 24, a substantially axially directed acutely conical backing surface 25 and a pair of shoulders 26 which mutually converge in the direction towards the related gauging surface 24. In this embodiment the adjustment guiding member is in the form of a ring 27 which engages surfaces 25.

The clamping means shown in FIGS. 5 and 6 consist in providing the adjustment guiding member 27 with an external screw thread engaged by ring nuts 28 having bearing portions 29 which envelope and ride upon the shoulders 26.

Figure 7:
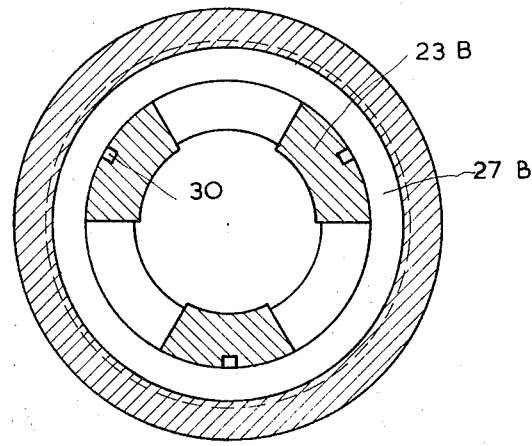
FIG. 7 is a view similar to FIG. 6, but showing a modified form of ring gauge having three gauging segments of reduced circumferential width.

Referring to FIG. 7, the arrangement is virtually the same as that shown in FIGS. 5 and 6, except for the fact that in those figures the segments are laterally separated by little more than is necessary for mechanical clearance between them, whereas in FIG. 7 the segments 23B are reduced in circumferential width and hence well spaced apart as shown. The segments 23B have keyways 30 running longitudinally of their backing surface, and these are engaged by keys fixed to the adjustment guiding member 27B. Similar key and keyway arrangements are preferably provided in other embodiments of the invention.

Figure 8:
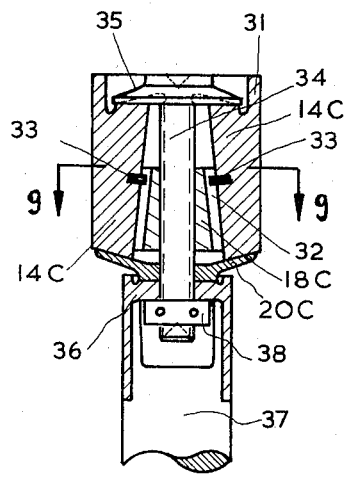
FIG. 8 is a view similar to FIG. 1 showing a modified form of plug gauge.
Figure 9:
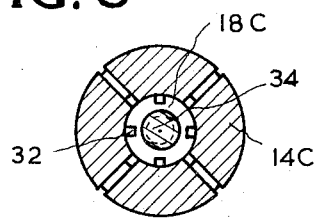
FIG. 9 is a sectional plan taken on line 9—9 in FIG. 8.

Referring to FIGS. 8 and 9 it will be seen that the embodiment there shown differs from those already described largely because of the different adjustment and clamping means. Here the segments 14C have end extensions 31 which extend sufficiently to permit gauging right up to the blind end of a cul-de-sac. The adjustment member 18C is the same as that shown in FIG. 1, in being an internally threaded cone frustrum, except for its having keyways 32 which receive keys 33 in the segments 14C in much the same way as described with reference to FIG. 7.

The adjusting and clamping means (in FIGS. 8 and 9) consist in a screw 34 which engages a thread inside the adjustment guide member 18C and at one end has a head 35 which is the equivalent of the uppermost of the two washers marked 20 in FIG. 1. At its other end the screw 34 carries a washer 20C, the ferrule 36 for a handpiece 37 and a clamping nut 38.

Figure 10:
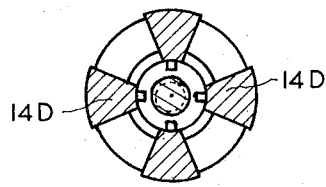
FIG. 10 is a view similar to FIG. 9 except for its showing of a plug gauge having four gauging segments of reduced circumferential width.

Referring to FIG. 10, the arrangement there shown is the same as that of FIGS. 8 and 9 except for the segments 14D being reduced in circumferential width by comparison with those shown in FIG. 9.

Figure 11:
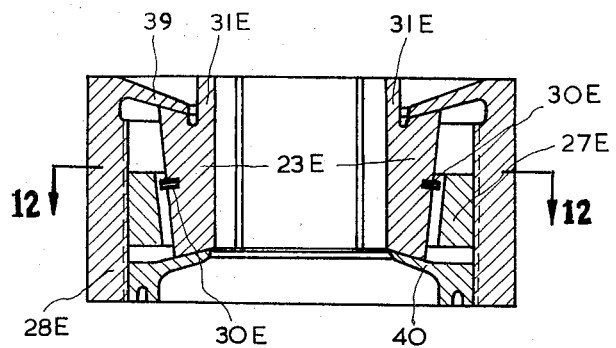
FIG. 11 is a view similar to FIG. 5 showing a further modified form of ring gauge.

Referring to FIG. 11, the segments have extensions 31E which permit gauging right up to a flange or web on a shaft or the like. The adjustment guiding member 27E is the same as that marked 27 in FIG. 5 except for being furnished with keys 30E which run in keyways in much the same way as previously explained. In this embodiment the clamping means are in the form of an internally threaded casing 28E screwed with member 27E and having an end flange 39 which is the equivalent of the uppermost bearing portion 29 as shown in FIG. 5. A retaining washer 40 is screwed inside casing 28E is the equivalent of the lowermost bearing portion marked 29 in FIG. 5.

Figure 12:
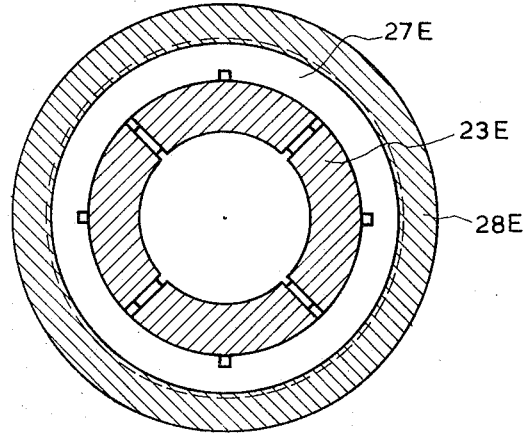
FIG. 12 is a sectional plan taken on line 12—12 in FIG. 11.
Figure 13:
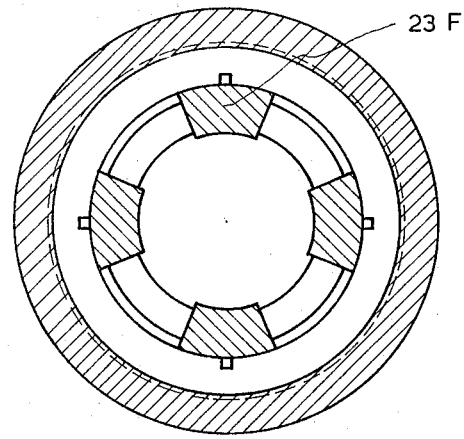
FIG. 13 is a view the same as FIG. 12 except for its showing of segments of diminished circumferential width by comparison with those shown in FIG. 12.

The ring gauge shown in FIG. 13 is the same as that shown in FIGS. 11 and 12 except for its segments 23F being circumferntially narrow by comparison with those shown in FIG. 12, in much the same way as explained above with reference to FIG. 7.

It will be appreciated that although the mutually engaging surfaces of the segments and the adjustment member (in any of the described embodiments) will almost invariably be of circular cross-sectional shape, they could be of polygonal or other non-circular cross-sectional shape.

Any of the gauges according hereto may be furnished with handles in conventional manner; moreover, two or more gauges may be associated together as, for example, GO and NOT GO gauges.

Although it is expected that gauges according hereto will almost invariably be used for testing the diametrical dimensions of cylindrical or other parallel sided articles, the invention may be readily applied to gauges for diametrical measurement of tapered threads or other tapered articles. Again, the invention is not necessarily confined to gauges in accordance with the commonly accepted meaning of that term, it is also applicable to adjustable circular screw-threading taps, dies, die-nuts and similar tools.

It will be understood that a number of minor features may be incorporated in gauges and the like according hereto. For example, nuts, set-screws or other items which have to be tightened to hold a selected gauge setting may be furnished with lock-washers, lock-nuts, locking grub-screws or similar devices intended to preserve adjusted settings. Again, parts of the gauges may be graduated so as to give indication as to the degree of adjustment and whether a selected setting is being maintained. In this regard, for example, a ring gauge such as that of FIGS. 5 and 6 could have one of its members 25 inscribed with a circumferential scale readable with reference to an index or zero mark on the companion member 25.

I claim:

1. An adjustable plug gauge comprising:
   a. an array of gauge elements grouped about a single axis, each of said gauge elements having a working surface, a backing surface opposite said working surface which is inclined relative to said axis, and two end shoulders which mutually converge in the direction of said working surface,
   b. a tapered adjustment and guiding member co-axial with said array and engaging said backing surfaces, and
   c. adjustment and clamping means for enabling selected axial displacement of said adjustment guiding member relative to said array, said adjustment and clamping means comprising stems extending co-axially from each end of said guiding member and integral therewith, at least one of said stems being threaded, internally tapered abutments on said stems, the abutment on said one stem being axially movable therealong, and a clamping nut on said one stem.

2. The guage of claim 1 wherein said stems threadably engage said guiding member.

3. A gauge according claim 1 wherein said abutments bear against the ends of said array.

4. A gauge according to claim 1 wherein said elements extend at one end of said array beyond said adjustment and clamping means to permit bottoming thereof within a blind-ended hole.

5. A gauge according to claim 1 wherein said elements and said adjustment and guiding member include keys and complimentary keyways for guidance of said adjustment and guiding member along said axis.

6. An adjustable plug gauge comprising:
   a. an array of gauge elements grouped about a single axis, each of said gauge elements having a working surface, a backing surface opposite said working surface which is inclined relative to said axis, and two end shoulders which converge toward one another at increasing radii from said axis,
   b. a tapered adjustment and guiding member co-axial with said array and engaging said backing surfaces, and
   c. adjustment and clamping means for enabling selected axial displacement of said adjustment guiding member relative to said array, said adjustment and clamping means comprising a threaded stem extending co-axially from the ends of said guiding member and therein being threaded, and an internally tapered abutment on each of the ends of said stem, with at least one of said internally tapered abutments being axially moveable along said stem, and a clamping nut on said stem end adjacent said moveable internally tapered abutment.

7. The gauge of claim 6 wherein one of said internally tapered abutments constitutes a fixed head on said stem.

8. A gauge according to claim 6 wherein said abutments bear against the ends of said array.

9. A gauge according to claim 6 wherein said elements extend at one end of said array beyond said adjustment and clamping means to permit bottoming thereof within a blind-ended hole.

10. A gauge according to claim 6 wherein said elements and said adjustment and guiding member include keys and complimentary keyways for guidance of said adjustment and guiding member along said axis.

* * * * *